US008889797B2

(12) United States Patent
Hong et al.

(10) Patent No.: US 8,889,797 B2
(45) Date of Patent: Nov. 18, 2014

(54) PREPARATION METHOD OF FLEXIBLE POLYLACTIDE STEREOCOMPLEX AND THE COMPOUND THEREOF

(75) Inventors: Chae Hwan Hong, Gyeonggi-do (KR); Do Suck Han, Gyeonggi-do (KR); Soo Hyun Kim, Seoul (KR); Young Mee Jung, Seoul (KR)

(73) Assignees: Hyundai Motor Company, Seoul (KR); Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/285,322

(22) Filed: Oct. 31, 2011

(65) Prior Publication Data

US 2013/0053464 A1 Feb. 28, 2013

(30) Foreign Application Priority Data

Aug. 25, 2011 (KR) ........................ 10-2011-0085182

(51) Int. Cl.
*C08G 63/08* (2006.01)
*C08J 9/00* (2006.01)
*C08J 9/12* (2006.01)
*C08G 63/81* (2006.01)

(52) U.S. Cl.
CPC ................ *C08G 63/08* (2013.01); *C08G 63/81* (2013.01)
USPC ................ 525/450; 521/134; 521/97; 521/82

(58) Field of Classification Search
USPC ............... 521/134, 97, 82; 525/437, 411, 450
See application file for complete search history.

(56) References Cited

U.S. PATENT DOCUMENTS

| 2009/0281249 | A1 | 11/2009 | Thatcher et al. |
| 2010/0093946 | A1 | 4/2010 | Thatcher et al. |
| 2011/0022163 | A1 | 1/2011 | Wang et al. |

FOREIGN PATENT DOCUMENTS

KR   10-2011-0093353 A   8/2011

OTHER PUBLICATIONS

Purnama et al., "Stereocomplex Formation of High-Molecular-Weight Polylactide Using Supercritical Fluid." Published Dec. 31, 2009. Macromolecules, 2010, vol. 43, pp. 1137-1142.*
Shirahama et al., "Characteristics of the Biodegradability and Physical Properties of Stereocomplexes between Poly(L-lactide) and Poly(D-lactide) Copolymers", Journal of Polymer Science, vol. 43, pp. 438-454 (2005).
Tsutsumi et al., "Study of impregnation of poly(L-lactide-ran-e-caprolactone) copolymers with useful compounds in supercritical carbon dioxide", J. Mater. Sci., vol. 44, pp. 3533-3541 (2009).
Jang et al., "Characteristics of Preparation and Thermal Properties of PLA Sterocomplex", Applied Chemistry, vol. 14, No. 1, pp. 1-4 (2010).

* cited by examiner

*Primary Examiner* — Kara Boyle
(74) *Attorney, Agent, or Firm* — Edwards Wildman Palmer LLP; Peter F. Corless

(57) ABSTRACT

Disclosed are a polylactide stereocomplex with improved thermal stability and thus improved processability and a method for preparing the same. In order to confer flexibility to polymer chains, D-type polylactide polymer containing a small amount of caprolactone (poly D-lactide-caprolactone copolymer) is synthesized and it is uniformly mixed with L-type single-phase polylactide to prepare a flexible polylactide stereocomplex. Since the polylactide stereocomplex having flexible polymer chains has superior heat resistance and mechanical stability and experiences little decrease of the degree of stereocomplex formation even after thermal processing, the polylactide stereocomplex having improved thermal stability can be advantageously used for engineering plastics requiring high strength and good thermal stability, alternative materials for general-use plastics, high-performance medical materials, or the like because of its remarkably improved processability.

12 Claims, 1 Drawing Sheet

PREPARATION METHOD OF FLEXIBLE POLYLACTIDE STEREOCOMPLEX AND THE COMPOUND THEREOF

CROSS-REFERENCE TO RELATED APPLICATIONS

This application claims priority to Korean Patent Application No. 10-2011-0085182, filed on Aug. 25, 2011, under 35 U.S.C. §119. The content of the aforementioned application is incorporated herein by reference in its entirety.

BACKGROUND (a) Technical Field

The present invention relates to a method for preparing a flexible polylactide stereocomplex and a polylactide stereocomplex prepared thereby.

(b) Background Art

Recently, with the rising concern about the environmental pollution caused by non-degradable, petroleum-based plastics and the depletion of petroleum resources, renewable natural resources such as starch, pectin, protein, etc., are attaining much attention for their applications in food packaging requiring biodegradability and water solubility. Biodegradable polymer materials are valued highly in many fields including medical science, agriculture, ecology, etc. due to their intrinsic degradability properties. More recently, their value is increasing rapidly in the field of ecology and medical science. The polymers can be largely classified into natural biodegradable polymers and synthetic biodegradable polymers. Although natural biodegradable polymers are known as promising due to their good environment-friendliness, physical performance and biocompatibility, they are expensive and it is difficult to control their properties as desired. On the other hand, the synthetic biodegradable polymers are valued highly in that their properties can be fine-tuned as desired. Therefore, their commercial value is highly esteemed these days.

Among the synthetic biodegradable polymer materials, polylactide (PLA) is widely used in the field of ecology and medical science due to its relatively superior performance as well as affinity for the environment and organisms, nontoxicity, or the like. It is used as material in the field of environment such as disposable packaging films, films for agricultural or industrial applications, food packaging containers, or the like. Also, it is developed and used for medical purposes, such as drug delivery systems (DDS), pins and screws for fixing bone and tissue, sutures, or the like. Furthermore, studies are carried out to use them in automobile parts and industrial materials by enhancing the thermal and mechanical stability of the biodegradable polymers.

The development of such new materials is directed to the development of environment-friendly products as well as the improvement of qualities. Accordingly, the need for new materials capable of satisfying such requirements is increasing in the industry. For example, a polymer stereocomplex prepared by melting two single-phase polymers having different enantiomerism or mixing them in an organic solvent at elevated temperature, provides a new crystal structure and better thermal and mechanical stability than that of the single-phase polymers. It may be the new material capable of satisfying the industrial needs [Ikeda et al., *Macromolecules*, 20, 904 (1987)]. In particular, since the stereocomplex can remarkably improve physical properties and performance of products and extend their service life, it can contribute to the reduction of environmental pollution. The stereocomplex is applicable in various fields depending on the kind and molecular weight of the polymers used, including automobile, packing materials, semiconductors, as well as food, medicine, communications and the military.

When high-molecular-weight linear polylactide is used to prepare the polylactide stereocomplex, the stereocomplex typically results in poor flexibility of the polymer chains because the single-phase polylactide itself has a rigid crystal structure. Also, in this case, it is reported that the formation of the stereocomplex decreases considerably after thermal processing and, as a result, the single-phase polylactide exists together with the polylactide stereocomplex (Penczek et. Al., *Macromolecules* 2006, 39, 3711). Thus, research has been directed to improve the flexibility of the single-phase polylactide when preparing the polylactide stereocomplex. The Penczek group reported that they prepared a nonlinear, star-shaped polylactide which has a molecular weight similar to that of linear polylactide so as to provide flexibility to the polymer chains, and prepared a polylactide stereocomplex using the polymer. After evaluation of thermal stability, they reported that the degree of stereocomplex formation does not decrease after thermal processing as compared to the linear polylactide.

In general, when preparing the stereocomplex, an organic solvent is used, or direct melt mixing or bulk polymerization is employed without using an organic solvent. Solution casting is used frequently, which requires an organic solvent capable of dissolving biopolymer well to prepare a biodegradable polymer stereocomplex. However, it is difficult to select a suitable organic solvent and a long times are required to completely remove the organic solvent after the stereocomplex is prepared [Tsugi et al., *Macromol. Biosci.*, 5, 569 (2005)]. The melt mixing method requires a high temperature of 200° C. or above, which may accelerate the degradation of the biodegradable polymer. It is known that, in that case, crystallization of the single-phase polymer is likely to be induced rather than the formation of the stereocomplex [Tsugi et al., *Macromolecules*, 25, 4144 (1992)]. Further, it is reported that the method is limited in preparing a high-molecular-weight, high-strength biodegradable polymer stereocomplex since it is known that the biodegradable polymer that can be prepared by the method has an average weight-average molecular weight of a hundred thousand [Fukushima et al., *Macromol. Symp.*, 224, 133 (2005)]. Thus, it can be seen that the above method is limited in preparing a high-strength biodegradable polymer stereocomplex having good thermal and mechanical stability. For these reasons, researches are ongoing on a new method for preparing a high-strength biodegradable polymer stereocomplex with a large weight-average molecular weight.

Carbon dioxide is a supercritical fluid widely used for its low critical temperature and pressure, low price, incombustibility and nontoxicity. However, the supercritical carbon dioxide has the problem that it cannot dissolve polymers other than fluoropolymers and silicon-based polymers (siloxane polymers).

SUMMARY

In order to prevent decreased stereocomplex formation after thermal processing when preparing a high-molecular-weight polylactide stereocomplex having superior thermal and mechanical stability, the inventors of the present invention have discovered a method wherein a small amount of caprolactone was added when preparing D-type single-phase polylactide so as to provide flexibility to the polymer chain of the poly D-lactide-caprolactone copolymer. A polylactide stereocomplex could be prepared in short time at constant temperature and pressure, using a convenient and economical supercritical fluid-organic solvent system. Thus prepared poly D-lactide-caprolactone copolymer was mixed with L-type single-phase polylactide to prepare a polylactide stereocomplex with improved thermal stability as well as superior heat resistance and mechanical stability, the degree of stereocomplex formation of which hardly decreases even after thermal processing.

The present invention is directed to providing a method for preparing a flexible polylactide stereocomplex using a convenient, economical and environment-friendly supercritical fluid-organic solvent system.

The present invention is also directed to providing a polylactide stereocomplex having excellent thermal and mechanical stability due to flexible polymer chains and improved processability with little decrease in stereocomplex formation after thermal processing.

Other features and aspects will be apparent from the following detailed description, the drawings, and the claims.

In one aspect, the present invention provides a method for preparing a flexible polylactide stereocomplex, comprising the steps of: (i) adding poly D-lactide-caprolactone copolymer and poly L-lactide polymer to a reactor; and (ii) polymerizing the two polymers into a polylactide stereocomplex by adding an organic solvent to the reactor and then injecting a supercritical fluid, to arrive at the flexible polyactide stereocomplex.

BRIEF DESCRIPTION OF THE DRAWINGS

The above and other objects, features and advantages of the present invention will now be described in detail with reference to certain exemplary embodiments thereof. The drawings are meant for illustration purposes only, and are not meant to limit the invention.

DETAILED DESCRIPTION

Figure 1:
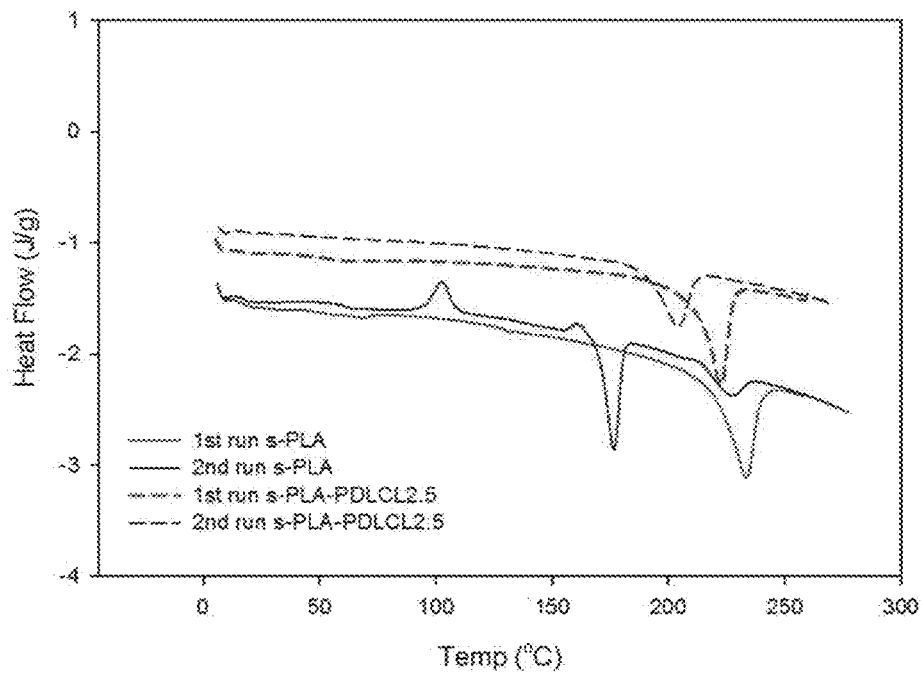
FIG. 1 shows a result of differential scanning calorimetry confirming the thermal stability of the flexible polylactide stereocomplex containing 2.5% of caprolactone prepared in Example 1 according to the present invention.

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In one aspect, the present invention provides a method for preparing a flexible polylactide stereocomplex, comprising the steps of: (i) adding poly D-lactide-caprolactone copolymer and poly L-lactide polymer to a reactor; and (ii) polymerizing the two polymers into a polylactide stereocomplex by adding an organic solvent to the reactor and then injecting a supercritical fluid; to arrive at the flexible polylactide stereocomplex.

In a specific embodiment of the present invention, the poly D-lactide-caprolactone copolymer comprises a ratio of poly D-lactide to polycaprolactone of about 99.5:0.5 to about 70:30. In certain embodiments, the ratio of poly D-lactide to polycaprolactone ranges from about 99:1 to about 70:30. In certain embodiments, the ratio of poly D-lactide to polycaprolactone ranges from about 98:2 to about 70:30. In certain embodiments, the ratio of poly D-lactide to polycaprolactone ranges from about 97:3 to about 70:30. In certain embodiments, the ratio of poly D-lactide to polycaprolactone ranges from about 95:5 to about 70:30. In certain embodiments, the ratio of poly D-lactide to polycaprolactone ranges from about 90:10 to about 70:30. In certain embodiments, the ratio of poly D-lactide to polycaprolactone ranges from about 99.5:0.5 to about 75:25. In certain embodiments, the ratio of poly D-lactide to polycaprolactone ranges from about 99.5:0.5 to about 80:20. In certain embodiments, the ratio of poly D-lactide to polycaprolactone ranges from about 99.5:0.5 to about 85:15. In certain embodiments, the ratio of poly D-lactide to polycaprolactone ranges from about 99.5:0.5 to about 90:10.

In a specific embodiment of the present invention, the poly D-lactide-caprolactone copolymer has a weight-average molecular weight of 25,000-500,000 Da. In a specific embodiment of the present invention, the poly D-lactide-caprolactone copolymer has a weight-average molecular weight of 70,000-300,000 Da. In a specific embodiment of the present invention, the poly D-lactide-caprolactone copolymer has a weight-average molecular weight of 75,000-250,000 Da. In a specific embodiment of the present invention, the poly D-lactide-caprolactone copolymer has a weight-average molecular weight of 70,000-150,000 Da. In a specific embodiment of the present invention, the poly D-lactide-caprolactone copolymer has a weight-average molecular weight of 80,000-100,000 Da. In a specific embodiment of the present invention, the poly D-lactide-caprolactone copolymer has a weight-average molecular weight of 90,000-120,000 Da. In a specific embodiment of the present invention, the poly D-lactide-caprolactone copolymer has a weight-average molecular weight of 100,000-250,000 Da.

In a specific embodiment of the present invention, the polylactide stereocomplex is prepared by solution casting using the organic solvent, by melt mixing or bulk polymerization, or using a supercritical fluid-organic solvent system.

In a specific embodiment of the present invention, the polylactide stereocomplex is in the form of particles or porous foams.

In a specific embodiment of the present invention, the supercritical fluid is a compressed gas of one or more selected from the group consisting of carbon dioxide ($CO_2$), dichlorotrifluoroethane (HFC-23), difluoromethane (HFC-32), difluoroethane (HFC-152a), trifluoroethane (HFC-143a), tetrafluoroethane (HFC-134a), pentafluoroethane (HFC-125), heptafluoropropane (HFC-227ea), hexafluoropropane (HFC-236fa), pentafluoropropane (HFC-245fa), sulfur hexafluoride ($SF_6$), perfluorocyclobutane (C-318), dichlorofluoroethane (HCFC-1416), chlorodifluoroethane (HCFC-1426), chlorofluoromethane (HCFC-22), dimethyl ether, nitrogen dioxide ($NO_2$), propane and butane. In certain embodiments, the supercritical fluid is carbon dioxide ($CO_2$), dichlorotrifluoroethane (HFC-23), difluoromethane (HFC-32), difluoroethane (HFC-152a), trifluoroethane (HFC-143a), tetrafluoroethane (HFC-134a), pentafluoroethane (HFC-125), dichlorofluoroethane (HCFC-1416), chlorodifluoroethane (HCFC-1426), or chlorofluoromethane (HCFC-22). In certain embodiments, the supercritical fluid is carbon dioxide ($CO_2$).

In a specific embodiment of the present invention, the organic solvent is one or more organic solvent selected from the group consisting of chloroform, dichloromethane, dioxane, toluene, xylene, ethylbenzene, dichloroethylene, dichloroethane, trichloroethylene, chlorobenzene, dichlorobenzene, tetrahydrofuran, dibenzyl ether, dimethyl ether, acetone, methyl ethyl ketone, cyclohexanone, acetophenone, methyl isobutyl ketone, isophorone, diisobutyl ketone, methyl acetate, ethyl formate, ethyl acetate, diethyl carbonate, diethyl sulfate, butyl acetate, diacetone alcohol, diethyl glycol monobutyl ether, decanol, benzoic acid, stearic acid, tetrachloroethane, hexafluoroisopropanol, hexafluoroacetone sesquihydrate, acetonitrile, chlorodifluoromethane, trifluoroethane and difluoroethane. In certain embodiments, the organic solvent is chloroform, dichloromethane, dichloroethylene, dichloroethane, trichloroethylene, chlorobenzene, dichlorobenzene, tetrachloroethane, hexafluoroisopropanol, hexafluoroacetone chlorodifluoromethane, trifluoroethane or difluoroethane. In certain embodiments, the organic solvent is dichloromethane, In a specific embodiment of the present invention, the poly D-lactide-caprolactone copolymer and the poly L-lactide polymer comprise about 1-50 parts by weight per 100 parts by weight of the organic solvent. In certain embodiments, the poly D-lactide-caprolactone copolymer and the poly L-lactide polymer comprise about 1-40 parts by weight per 100 parts by weight of the organic solvent. In certain embodiments, the poly D-lactide-caprolactone copolymer and the poly L-lactide polymer comprise about 1-25 parts by weight per 100 parts by weight of the organic solvent. In certain embodiments, the poly D-lactide-caprolactone copolymer and the poly L-lactide polymer comprise about 1-10 parts by weight per 100 parts by weight of the organic solvent. In certain embodiments, the poly D-lactide-caprolactone copolymer and the poly L-lactide polymer comprise about 1-5 parts by weight per 100 parts by weight of the organic solvent. In certain embodiments, the poly D-lactide-caprolactone copolymer and the poly L-lactide polymer comprise about 2-40 parts by weight per 100 parts by weight of the organic solvent. In certain embodiments, the poly D-lactide-caprolactone copolymer and the poly L-lactide polymer comprise about 5-40 parts by weight per 100 parts by weight of the organic solvent. In certain embodiments, the poly D-lactide-caprolactone copolymer and the poly L-lactide polymer comprise about 10-40 parts by weight per 100 parts by weight of the organic solvent. In certain embodiments, the poly D-lactide-caprolactone copolymer and the poly L-lactide polymer comprise about 15-40 parts by weight per 100 parts by weight of the organic solvent. In certain embodiments, the poly D-lactide-caprolactone copolymer and the poly L-lactide polymer comprise about 20-40 parts by weight per 100 parts by weight of the organic solvent.

In a specific embodiment of the present invention, the organic solvent comprises about 0.5-100 parts by weight per 100 parts by weight of the supercritical fluid. In a specific embodiment of the present invention, the organic solvent comprises about 0.5-90 parts by weight per 100 parts by weight of the supercritical fluid. In a specific embodiment of the present invention, the organic solvent comprises about 0.5-75 parts by weight per 100 parts by weight of the supercritical fluid. In a specific embodiment of the present invention, the organic solvent comprises about 0.5-50 parts by weight per 100 parts by weight of the supercritical fluid. In a specific embodiment of the present invention, the organic solvent comprises about 0.5-25 parts by weight per 100 parts by weight of the supercritical fluid. In a specific embodiment of the present invention, the organic solvent comprises about 0.5-10 parts by weight per 100 parts by weight of the supercritical fluid. In a specific embodiment of the present invention, the organic solvent comprises about 1-100 parts by weight per 100 parts by weight of the supercritical fluid. In a specific embodiment of the present invention, the organic solvent comprises about 5-100 parts by weight per 100 parts by weight of the supercritical fluid. In a specific embodiment of the present invention, the organic solvent comprises about 10-100 parts by weight per 100 parts by weight of the supercritical fluid. In a specific embodiment of the present invention, the organic solvent comprises about 25-100 parts by weight per 100 parts by weight of the supercritical fluid. In a specific embodiment of the present invention, the organic solvent comprises about 50-100 parts by weight per 100 parts by weight of the supercritical fluid.

In a specific embodiment of the present invention, the step (ii) is performed at a temperature of 25-250° C. In certain embodiments, the temperature ranges from about 50-250° C. In certain embodiments, the temperature ranges from about 75-250° C. In certain embodiments, the temperature ranges from about 100-250° C. In certain embodiments, the temperature ranges from about 150-250° C. In certain embodiments, the temperature ranges from about 25-150° C. In certain embodiments, the temperature ranges from about 25-100° C. In certain embodiments, the temperature ranges from about 25-75° C.

In a specific embodiment of the present invention, the step (ii) is performed at a pressure of about 40-700 bar. In certain embodiments, the pressure is about 40-500 bar. In certain embodiments, the pressure is about 40-250 bar. In certain embodiments, the pressure is about 40-100 bar. In certain embodiments, the pressure is about 50-700 bar. In certain embodiments, the pressure is about 100-700 bar. In certain embodiments, the pressure is about 200-700 bar.

In a specific embodiment of the present invention, the step (ii) is performed at a temperature of 25-250° C. and a pressure of 40-700 bar.

In a specific embodiment of the present invention, the step (ii) is performed for 5 minutes to 10 hours. In certain embodiments, step (ii) is performed for 5 minutes to 5 hours. In certain embodiments, step (ii) is performed for 5 minutes to 2.5 hours. In certain embodiments, step (ii) is performed for 5 minutes to 1 hour. In certain embodiments, step (ii) is performed for 10 minutes to 10 hours. In certain embodiments, step (ii) is performed for 30 minutes to 10 hours. In certain embodiments, step (ii) is performed for 60 minutes to 10 hours.

In a specific embodiment of the present invention, after the step (ii) is completed, the pressure inside the reactor is reduced to control the porosity and pore size of the polylactide stereocomplex. More specifically, the reduction of the pressure inside the reactor is performed by lowering the injection speed of the supercritical fluid and the solvent in the reactor.

In another aspect, the present invention provides a polylactide stereocomplex prepared by the above-described preparation method.

Hereinafter, the present invention will be described in more detail.

In the step (i) of the preparation method of the present invention, the poly D-lactide-caprolactone copolymer is formed from polymerization of the crystalline polymer D-polylactide (PDLA) with the flexible polymer polycaprolactone (PCL). The polymerization is performed at 120-150° C. for 1-3 days under nitrogen atmosphere or vacuum atmosphere. Specifically, the copolymerization ratio of the PDLA and the PCL may be 99.5:0.5 to 70:30.

The poly D-lactide-caprolactone copolymer formed by the polymerization is a synthetic biodegradable polymer having a weight-average molecular weight of 70,000 Da or larger. Specifically, it may have a weight-average molecular weight of 100,000-300,000 Da.

In the step (ii), the polylactide stereocomplex is prepared from the poly D-lactide-caprolactone copolymer and the single-phase poly L-lactide.

In the present invention, the polylactide stereocomplex is defined as a polymer stereocomplex comprising lactide as monomers. In general, the polylactide stereocomplex has a higher melting point for crystallization than the single-phase polymer and thus has enhanced thermal durability.

The stereocomplex may be prepared by solution casting using an organic solvent, by melt mixing or bulk polymerization, or using a supercritical fluid-organic solvent system.

The flexible polylactide stereocomplex is prepared using the poly D-lactide-caprolactone copolymer, which is copolymerized from poly D-lactide and polycaprolactone to improve the flexibility of the polymer chains, instead of using D-type single-phase polylactide only. Since the weight ratio of the polycaprolactone is maintained at 20% or below, the poly D-lactide-caprolactone copolymer retains chirality.

As a result of testing thermal stability of the polylactide stereocomplex, the degree of stereocomplex formation was 60-100% after the first thermal processing, but the degree of stereocomplex formation after the second thermal processing varied depending on the quantity of the added caprolactone. When no flexibility was conferred to the polymer chains, the degree of stereocomplex formation decreased significantly after the second thermal processing to about 30%. In contrast, when the polylactide stereocomplex was prepared using the poly D-lactide-caprolactone copolymer comprising 2.5% of caprolactone based on the weight of D-lactide retained the degree of stereocomplex formation at 100% even after the second thermal processing. Accordingly, the poly D-lactide-caprolactone copolymer in the step (i) has a weight ratio of caprolactone to D-lactide of specifically 2-20%.

More specifically, in the step (ii), the flexible polylactide stereocomplex may be prepared using the supercritical fluid-organic solvent system.

In the method for preparing a flexible polylactide stereocomplex, a compressed gas of a supercritical fluid and a small amount of an organic solvent are used to dissolve and uniformly mix the poly D-lactide-caprolactone copolymer and the poly L-lactide. Then, crystallization is carried out at constant temperature and pressure to prepare the flexible polylactide stereocomplex.

In the present invention, the supercritical fluid is defined as a substance at a state above its critical temperature ($T_c$) and critical pressure ($P_c$). Every pure gas has a critical temperature ($T_c$) above which it cannot be liquefied by compression and a critical pressure ($P_c$) which is required to liquefy the gas at the critical temperature. Since the supercritical fluid above its critical temperature and critical pressure has a dissolving power comparable to that of a liquid and also has a gas-like viscosity property, it can replace the noncompressible organic solvent.

One of the most important advantages of using the supercritical fluid as a continuous medium in the polymer reaction is that it is possible to control the solubility of the polymer simply by changing the temperature or pressure of the reaction system and thus by controlling the solvent properties such as the dielectric constant. Although carbon dioxide is a frequently used supercritical fluid for its low critical temperature and pressure, low price, incombustibility and nontoxicity, it has the problem that it cannot dissolve polymers other than fluoropolymers and silicon-based polymers. In particular, polyester-based biodegradable polymers such as polylactide are known to be hardly dissolved in the supercritical carbon dioxide. On the contrary, it is used as an antisolvent when preparing polymer particles by supercritical fluid precipitation. It is known that polylactide is not completely dissolved in pure supercritical carbon dioxide even at a high pressure of 80 MPa or above and a high temperature of 373.15 K or above [Lee et al., *J. Chem. Eng. Data,* 45, 1162 (2000)].

In contrast, when such organic solvents as chloroform, dichloromethane or dioxane are used, the polyester-based biodegradable polymer can be easily dissolved even at room temperature. Accordingly, the solubility of the polymer can be increased by adding a small amount of an organic solvent to the supercritical carbon dioxide due to the interaction between the polar moment of the organic solvent and that of the ester group of the polyester-based biodegradable polymer.

In various embodiments, after adding the poly D-lactide-caprolactone copolymer and the L-type single-phase polylactide polymer to the reactor, the organic solvent is added and the compressed gas of the supercritical fluid is injected as a reaction solvent. Then, the resulting mixture is stirred at a temperature of 25-250° C., more specifically 25-150° C., and a pressure of 40-700 bar, more specifically 100-400 bar, to prepare the flexible polylactide stereocomplex.

When the reaction pressure is below 40 bar, the amount of the single-phase polymer that can be held in the reactor decreases, thus resulting in decreased amount of polylactide stereocomplex produced. And, when the pressure inside the reactor exceeds 700 bar, the operation cost of the entire reaction system increases greatly.

When the reaction temperature is below 25° C., the formation of the supercritical carbon dioxide is inhibited since the temperature is below the critical point of carbon dioxide gas. And, when the reaction temperature exceeds 150° C., the formation of the polylactide stereocomplex decreases because the polymer is pyrolyzed. Thus, the reaction temperature may be specifically 25-150° C., more specifically 35-150° C.

When the reaction time is within 10 hours, the degree of polylactide stereocomplex formation reaches 100%. When the reaction time is longer, pyrolysis may occur. Thus, the reaction time may be specifically 5 minutes to 10 hours, more specifically, 10 minutes to 5 hours.

The supercritical fluid may be, for example, a compressed gas of one or more selected from the group consisting of carbon dioxide ($CO_2$), dichlorotrifluoroethane (HFC-23), difluoromethane (HFC-32), difluoroethane (HFC-152a), trifluoroethane (HFC-143a), tetrafluoroethane (HFC-134a), pentafluoroethane (HFC-125), heptafluoropropane (HFC-227ea), hexafluoropropane (HFC-236fa), pentafluoropropane (HFC-245fa), sulfur hexafluoride ($SF_6$), perfluorocyclobutane (C-318), dichlorofluoroethane (HCFC-1416), chlorodifluoroethane (HCFC-1426), chlorofluoromethane (HCFC-22), dimethyl ether, nitrogen dioxide ($NO_2$), propane and butane, but is not limited thereto.

The supercritical fluid is passed through a condenser so that it is completely liquefied and then injected into the reactor using a high-pressure liquid pump.

The organic solvent of the supercritical fluid-organic solvent system may be, for example, one or more selected from the group consisting of chloroform, dichloromethane, dioxane, toluene, xylene, ethylbenzene, dichloroethylene, dichloroethane, trichloroethylene, chlorobenzene, dichlorobenzene, tetrahydrofuran, dibenzyl ether, dimethyl ether, acetone, methyl ethyl ketone, cyclohexanone, acetophenone, methyl isobutyl ketone, isophorone, diisobutyl ketone, methyl acetate, ethyl formate, ethyl acetate, diethyl carbonate, diethyl sulfate, butyl acetate, diacetone alcohol, diethyl glycol monobutyl ether, decanol, benzoic acid, stearic acid, tetrachloroethane, hexafluoroisopropanol, hexafluoroacetone sesquihydrate, acetonitrile, chlorodifluoromethane, trifluoroethane and difluoroethane, but is not limited thereto.

In the present invention, when a mixture of the supercritical fluid and the organic solvent is used as the reaction solvent, the total weight fraction of the single-phase polylactide injected initially may be 1-50 parts by weight based on 100 parts by weight of the total solvent. When the weight fraction of the single-phase polylactide is less than 1 part by weight, the efficiency of the solvent mixture system decreases and it is difficult to retain the shape of the polylactide stereocomplex produced in the form of particles or porous foams. And, when the weight fraction exceeds 50 parts by weight, the degree of polylactide stereocomplex formation decreases and it is likely that nonuniform stereocomplex will be formed.

Also, in the present invention, the weight fraction of the organic solvent may be 0.5-100 parts by weight based on 100 parts by weight of the supercritical fluid. When the weight fraction of the organic solvent is less than 0.5 part by weight, the effect of solubility improvement by the organic solvent is only slight and thus the degree of polylactide stereocomplex formation decreases. And, when weight fraction of the organic solvent exceeds 100 parts by weight, the toxicity of the residual organic solvent may offset the environmental friendliness of the supercritical fluid.

The reactor used in the present invention is a high-pressure reactor for use at a high pressure of about 350 bar and may be equipped with a proportional—integral—derivative temperature controller, a thermometer, a heater, a pressure gauge, a safety valve, a stirrer for stirring the reactants, a speed controller, a tachometer for speed measurement, or the like.

The injection of the supercritical fluid may be performed by batch or continuous operation, and the injected compressed gas may completely dissolve the injected single-phase polymer and the produced polylactide stereocomplex polymer to ensure uniform reaction.

In the present invention, the degree of polylactide stereocomplex formation may be controlled with the kind of the supercritical fluid, the kind of the organic solvent, the total concentration of the solvent, the weight ratio of the supercritical fluid and the organic solvent, the reaction temperature, the reaction pressure, the reaction time, or the like.

After the reaction is completed, the product inside the reactor may be sprayed into the atmosphere to collect the polylactide stereocomplex polymer particles (powder). Alternatively, after the reaction is completed, the pressure inside the reactor may be reduced while controlling the injection speed of the supercritical fluid and the solvent in the reactor to obtain polylactide stereocomplex polymers in the form of foams with different porosity and pore size.

The method for preparing the flexible polylactide stereocomplex with improved thermal stability according to the present invention does not require the removal of the residual organic solvent in the stereocomplex and is environment-friendly since the solvent can be recycled. Also, since the high-molecular-weight polylactide stereocomplex can be produced without adding a stabilizer, the polylactide stereocomplex with superior thermal stability as well as good strength and improved processability can be prepared via a single, continuous process. Furthermore, since the polylactide stereocomplex prepared according to the present invention has little residual organic solvent and has good physical properties and remarkably improved processability with little degradation in properties after thermal processing, it can be utilized for general-use and medical materials. Also, it may be as engineering plastics requiring high strength and good thermal stability, alternative materials for general-use plastics, high-performance medical materials, or the like.

EXAMPLES

The examples and experiments will now be described. The following examples and experiments are for illustrative purposes only and not intended to limit the scope of this invention.

Example 1

Poly L-lactide (0.84 g, weight-average molecular weight=150,000) and poly D-lactide-caprolactone copolymer (0.84 g, weight-average molecular weight=164,000, weight ratio of caprolactone to L-lactide=2.5%) were added to a 40-mL high-pressure reactor. The weight ratio of the polymers to the total solvent (supercritical carbon dioxide (70 wt %) and dichloromethane (30 wt %)) was 5:100. After charging the high-pressure reactor holding the two polymers with nitrogen for 5 minutes, the reactor was maintained at vacuum state at 40° C. for an hour. Then, after injecting the organic solvent using a syringe, carbon dioxide was injected into the high-pressure reactor using a high-pressure liquid pump. After maintaining the temperature inside the reactor at 65° C., heat and pressure applied gradually until the pressure inside the reactor reached 350 bar. When the temperature and pressure became constant, reaction was carried out for 5 hours with stirring. When the reaction was completed, the reactor was immediately opened to terminate the reaction. A polylactide stereocomplex was obtained in the form of powder. For comparison of thermal processability, a polylactide stereocomplex was prepared using pure poly L-lactide and poly D-lactide without containing caprolactone and thermal stability was compared.

For evaluation of the thermal stability of the polylactide stereocomplex, differential scanning calorimetric analysis was performed consecutively for 2 times. As a result, for the pure polylactide stereocomplex containing no caprolactone, one melting peak was observed at 230° C. in the first cycle, but two appeared at 180° C. and 230° C. in the second cycle. This is because part of the stereocomplex is changed to the single-phase polylactide structure by the heat applied during the first cycle, thus resulting in coexistence of the single-phase polylactide and the polylactide stereocomplex. In contrast, for the flexible polylactide stereocomplex, only one melting peak was observed at 230° C. in the second cycle, revealing that the degree of polylactide stereocomplex formation was not decreased at all (FIG. 1).

Example 2

For evaluation of the effect of the caprolactone content on the improvement of thermal stability due to increased flexibility of polymer chains, polylactide stereocomplexes were prepared with various caprolactone contents. Poly L-lactide (0.84 g, weight-average molecular weight=150,000) and poly D-lactide-caprolactone copolymer [0.84 g, weight ratio of caprolactone to L-lactide=0.6% (weight-average molecular weight=164,000), 1.2% (weight-average molecular weight=131,000), 2.5% (weight-average molecular weight=164,000), 5% (weight-average molecular weight=184,000), 10% (weight-average molecular weight=174,000) or 20% (weight-average molecular weight=196,000)] were added to a 40-mL high-pressure reactor. The weight ratio of the polymers to the total solvent (supercritical carbon dioxide (70 wt %) and dichloromethane (30 wt %)) was 5:100. After charging the high-pressure reactor holding the two polymers with nitrogen for 5 minutes, the reactor was maintained at vacuum state at 40° C. for an hour.

Then, after injecting the organic solvent using a syringe, carbon dioxide was injected into the high-pressure reactor using a high-pressure liquid pump. After maintaining the temperature inside the reactor at 65° C., heat and pressure applied gradually until the pressure inside the reactor reached 350 bar. When the temperature and pressure became constant, reaction was carried out for 5 hours with stirring. When the reaction was completed, the reactor was immediately opened to terminate the reaction. A polylactide stereocomplex was obtained in the form of powder.

Figure 2:
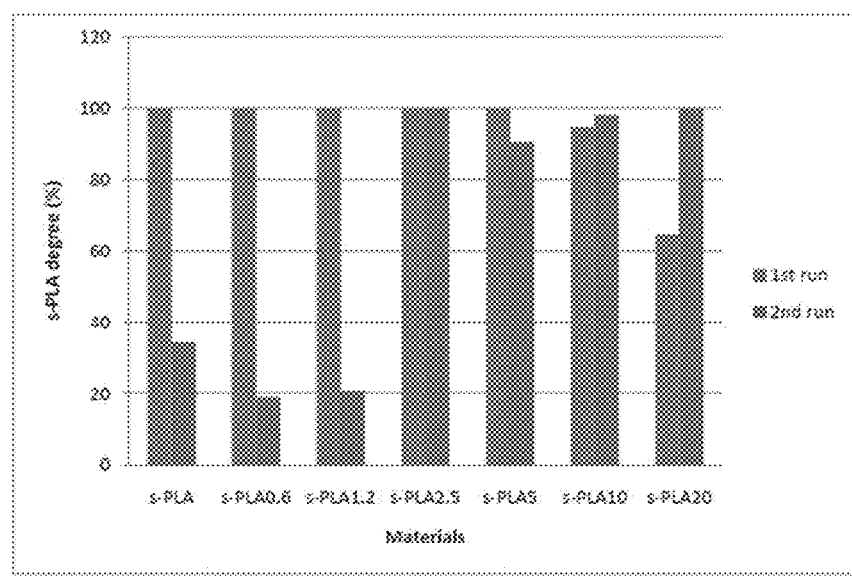
FIG. 2 shows change in the degree of stereocomplex formation after thermal processing for polylactide stereocomplexes with different caprolactone contents prepared in Example 2 according to the present invention.

For evaluation of the thermal stability of the polylactide stereocomplexes, differential scanning calorimetric analysis was performed consecutively for 2 times in the same manner as in Example 1. The degree of stereocomplex formation was calculated from integration of melting peaks. As a result, when the weight ration of caprolactone to D-lactide was 1.2% or smaller, the effect on the flexibility of polymer chains was almost nonexistent and the degree of stereocomplex formation was decreased significantly similarly to the sample containing no caprolactone. In contrast, the polylactide stereocomplexes prepared from the poly D-lactide-caprolactone copolymers containing 2.5% or more caprolactone showed no decrease of the degree of stereocomplex formation in the second cycle of the differential scanning calorimetric analysis (FIG. 2).

Since the polylactide stereocomplex having flexible polymer chains has superior heat resistance and mechanical stability and experiences little decrease of the degree of stereocomplex formation even after thermal processing, the polylactide stereocomplex having improved thermal stability can be advantageously used for engineering plastics requiring high strength and good thermal stability, alternative materials for general-use plastics, high-performance medical materials, or the like because of its remarkably improved processability.

Also, the method of preparing the flexible polylactide stereocomplex using a mixture of a compressed gas of a supercritical fluid and an organic solvent as the reaction solvent according to the present invention allows the preparation of the high-molecular-weight polylactide stereocomplex via an environment-friendly and remarkably simplified process using a small amount of the organic solvent.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

INCORPORATION BY REFERENCE

The contents of all references (including literature references, issued patents, published patent applications, and co-pending patent applications) cited throughout this application are hereby expressly incorporated herein in their entireties by reference.

EQUIVALENTS

Those skilled in the art will recognize, or be able to ascertain using no more than routine experimentation, many equivalents of the specific embodiments of the invention described herein. Such equivalents are intended with be encompassed by the following claims.

What is claimed is:

1. A method for preparing a polylactide stereocomplex, comprising the steps of:
   (i) adding poly D-lactide-caprolactone copolymer and poly L-lactide polymer to a reactor; and
   (ii) adding an organic solvent to the reactor and then injecting a supercritical fluid to form the polylactide stereocomplex comprising the poly D-lactide-caprolactone copolymer and poly L-lactide polymer,
   wherein the poly D-lactide-caprolactone copolymer comprises a ratio of poly D-lactide to polycaprolactone of about 99.5:0.5 to about 95.0:5.0.

2. The preparation method according to claim 1, wherein the poly D-lactide-caprolactone copolymer has a weight-average molecular weight of 70,000-300,000 Da.

3. The preparation method according to claim 1, wherein the polylactide stereocomplex is prepared by solution casting using the organic solvent, by melt mixing or bulk polymerization, or by using a supercritical fluid-organic solvent system.

4. The preparation method according to claim 1, wherein the polylactide stereocomplex is in a form of particles or porous foams.

5. The preparation method according to claim 1, wherein the supercritical fluid is a compressed gas of one or more selected from the group consisting of carbon dioxide ($CO_2$), dichlorotrifluoroethane (HFC-23), difluoromethane (HFC-32), difluoroethane (HFC-152a), trifluoroethane (HFC-143a), tetrafluoroethane (HFC-134a), pentafluoroethane (HFC-125), heptafluoropropane (HFC-227ea), hexafluoropropane (HFC-236fa), pentafluoropropane (HFC-245fa), sulfur hexafluoride ($SF_6$), perfluorocyclobutane (C-318), dichlorofluoroethane (HCFC-1416), chlorodifluoroethane (HCFC-1426), chlorofluoromethane (HCFC-22), dimethyl ether, nitrogen dioxide ($NO_2$), propane and butane.

6. The preparation method according to claim 1, wherein the organic solvent is one or more organic solvent selected from the group consisting of chloroform, dichloromethane, dioxane, toluene, xylene, ethylbenzene, dichloroethylene, dichloroethane, trichloroethylene, chlorobenzene, dichlorobenzene, tetrahydrofuran, dibenzyl ether, dimethyl ether, acetone, methyl ethyl ketone, cyclohexanone, acetophenone, methyl isobutyl ketone, isophorone, diisobutyl ketone, methyl acetate, ethyl formate, ethyl acetate, diethyl carbonate, diethyl sulfate, butyl acetate, diacetone alcohol, diethyl glycol monobutyl ether, decanol, benzoic acid, stearic acid, tetrachloroethane, hexafluoroisopropanol, hexafluoroacetone sesquihydrate, acetonitrile, chlorodifluoromethane, trifluoroethane and difluoroethane.

7. The preparation method according to claim 1, wherein the poly D-lactide-caprolactone copolymer and the poly L-lactide polymer comprise 1-50 parts by weight per 100 parts by weight of the organic solvent.

8. The preparation method according to claim 1, wherein the organic solvent comprises 0.5-100 parts by weight per 100 parts by weight of the supercritical fluid.

9. The preparation method according to claim 1, wherein said polymerizing the polylactide stereocomplex is performed at a temperature of 25-250° C. and a pressure of 40-700 bar.

10. The preparation method according to claim 1, wherein said polymerizing the polylactide stereocomplex is performed for 5 minutes to 10 hours.

11. The preparation method according to claim 1, further comprising the step of reducing pressure inside the reactor to control porosity and pore size of the polylactide stereocomplex.

12. The preparation method according to claim 11, wherein the reduction of the pressure inside the reactor is performed by lowering an injection speed of the supercritical fluid and the solvent in the reactor.

* * * * *